United States Patent
Makino

(10) Patent No.: US 9,891,613 B2
(45) Date of Patent: Feb. 13, 2018

(54) NUMERICAL CONTROLLER HAVING FUNCTION OF SUPERIMPOSING SUPERPOSITION CYCLE SYNCHRONIZED WITH PERIODIC OPERATION CYCLE

(71) Applicant: FANUC Corporation, Minamitsuru-gun, Yamanashi (JP)

(72) Inventor: Iwao Makino, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 279 days.

(21) Appl. No.: 14/734,011

(22) Filed: Jun. 9, 2015

(65) Prior Publication Data

US 2015/0362910 A1    Dec. 17, 2015

(30) Foreign Application Priority Data

Jun. 13, 2014 (JP) ................................. 2014-122249

(51) Int. Cl.
*G05B 19/402* (2006.01)
*G05B 19/4155* (2006.01)

(52) U.S. Cl.
CPC ....... G05B 19/402 (2013.01); G05B 19/4155 (2013.01); *G05B 2219/35519* (2013.01); *G05B 2219/41457* (2013.01)

(58) Field of Classification Search
CPC .............. G05B 19/402; G05B 19/4155; G05B 2219/35519; G05B 2219/41457
See application file for complete search history.

(56) References Cited

U.S. PATENT DOCUMENTS

| 5,267,142 | A  | * | 11/1993 | Kono    | G05B 19/416  |
|           |    |   |         |         | 318/595      |
| 7,174,226 | B2 | * | 2/2007  | Nakazato| G05B 19/19   |
|           |    |   |         |         | 700/159      |
| 7,206,659 | B2 | * | 4/2007  | Hosokawa| G05B 19/404  |
|           |    |   |         |         | 700/159      |
| 7,254,461 | B2 | * | 8/2007  | Hosokawa| G05B 19/4063 |
|           |    |   |         |         | 700/173      |

(Continued)

FOREIGN PATENT DOCUMENTS

CN      1848011 A     10/2006
CN    202166871 U      3/2012

(Continued)

OTHER PUBLICATIONS

Notification of Reasons for Refusal issued Oct. 27, 2015 in Japanese Patent Application No. 2014-122249 (4 pages) with an English translation (3 pages).

(Continued)

*Primary Examiner* — M. N. Von Buhr
(74) *Attorney, Agent, or Firm* — Drinker Biddle & Reath LLP

(57) ABSTRACT

A numerical controller controls a machine tool which carries out machining by moving a workpiece or a tool using a periodic operation cycle for repeatedly executing the same operation. The numerical controller stores command data of each execution period of a superposition cycle superimposed with the periodic operation cycle. Command data sets of the superposition cycle are synthesized every execution cycle in synchronization with execution timing of the periodic operation cycle.

4 Claims, 8 Drawing Sheets

(56) References Cited

U.S. PATENT DOCUMENTS

| | | | |
|---|---|---|---|
| 7,479,750 B2* | 1/2009 | Iwashita | G05B 19/404 |
| | | | 318/560 |
| 8,195,325 B2* | 6/2012 | Hosokawa | G05B 19/19 |
| | | | 700/173 |
| 9,523,979 B2* | 12/2016 | Hashizume | G05B 19/4063 |
| 9,599,979 B2* | 3/2017 | Hamada | G05B 19/404 |
| 2004/0145333 A1 | 7/2004 | Toyozawa et al. | |
| 2005/0215176 A1 | 9/2005 | Sakagami et al. | |
| 2014/0222186 A1 | 8/2014 | Wada et al. | |

FOREIGN PATENT DOCUMENTS

| | | | |
|---|---|---|---|
| DE | 102009026412 A1 * | 12/2009 | G05B 19/408 |
| EP | 1688808 B1 * | 3/2014 | G05B 19/404 |
| JP | H06-309021 A | 11/1994 | |
| JP | 2004-280772 A | 10/2004 | |
| JP | 2010-009094 A | 1/2010 | |
| JP | 2013-054436 A | 3/2013 | |
| KR | 20030018916 A | 3/2003 | |
| WO | WO-2004/102290 A1 | 11/2004 | |

OTHER PUBLICATIONS

The Notification of the First Office Action dated Mar. 3, 2017 in Chinese Patent Application No. 201510329316X (5 pages) with an English translation (7 pages).

* cited by examiner

FIG.2

20001=10 (REPEAT COUNT IS 10)  
20002=360 (THE NUMBER OF DATA SETS IS 360) } HEADER OF PERIODIC OPERATION CYCLE 1  
20003=40000 (START NUMBER OF DISTRIBUTION DATA OF FIRST AXIS IS #40000)  
..

30001=0 (REPEAT COUNT COMPLIES WITH HEADER OF PERIODIC OPERATION CYCLE)  
30002=0 (THE NUMBER OF DATA SETS COMPLIES WITH HEADER OF PERIODIC OPERATION CYCLE) } HEADER OF SUPERPOSITION CYCLE 1  
30003=90000 (START NUMBER OF SUPERPOSITION DATA OF FIRST AXIS IS #90000)  
..

40000=10 (FIRST DISTRIBUTION DATA OF FIRST AXIS)  
..  
40359=5 (360-TH DISTRIBUTION DATA OF FIRST AXIS) } DISTRIBUTION DATA OF FIRST AXIS OF PERIODIC OPERATION CYCLE 1 (PCYC1 TO PCYC360)  
..

90000=2 (FIRST DISTRIBUTION DATA OF FIRST AXIS)  
..  
90359=1 (360-TH DISTRIBUTION DATA OF FIRST AXIS) } SUPERPOSITION DATA OF FIRST AXIS OF SUPERPOSITION CYCLE 1 (SCYC1 TO SCYC360)  
..

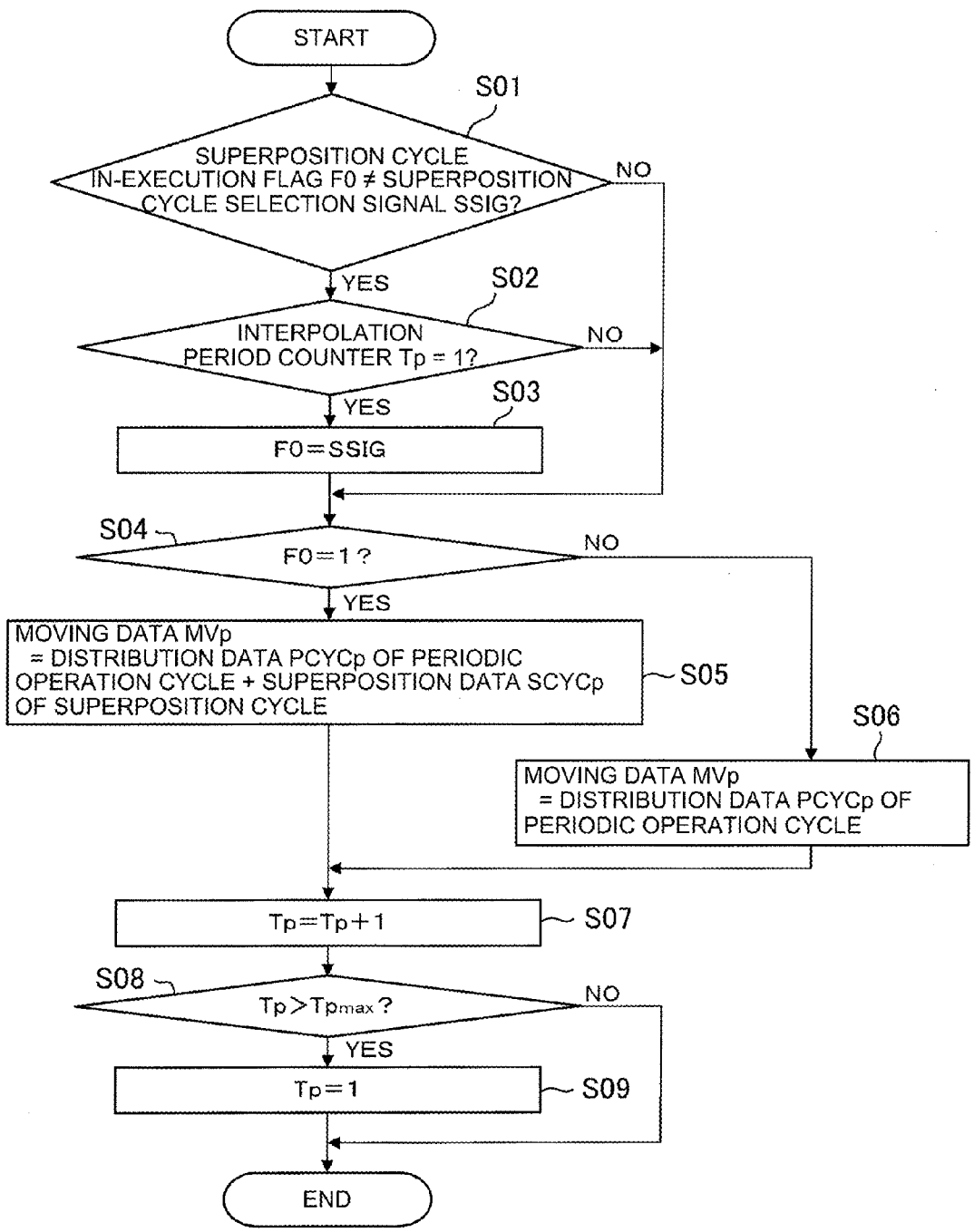

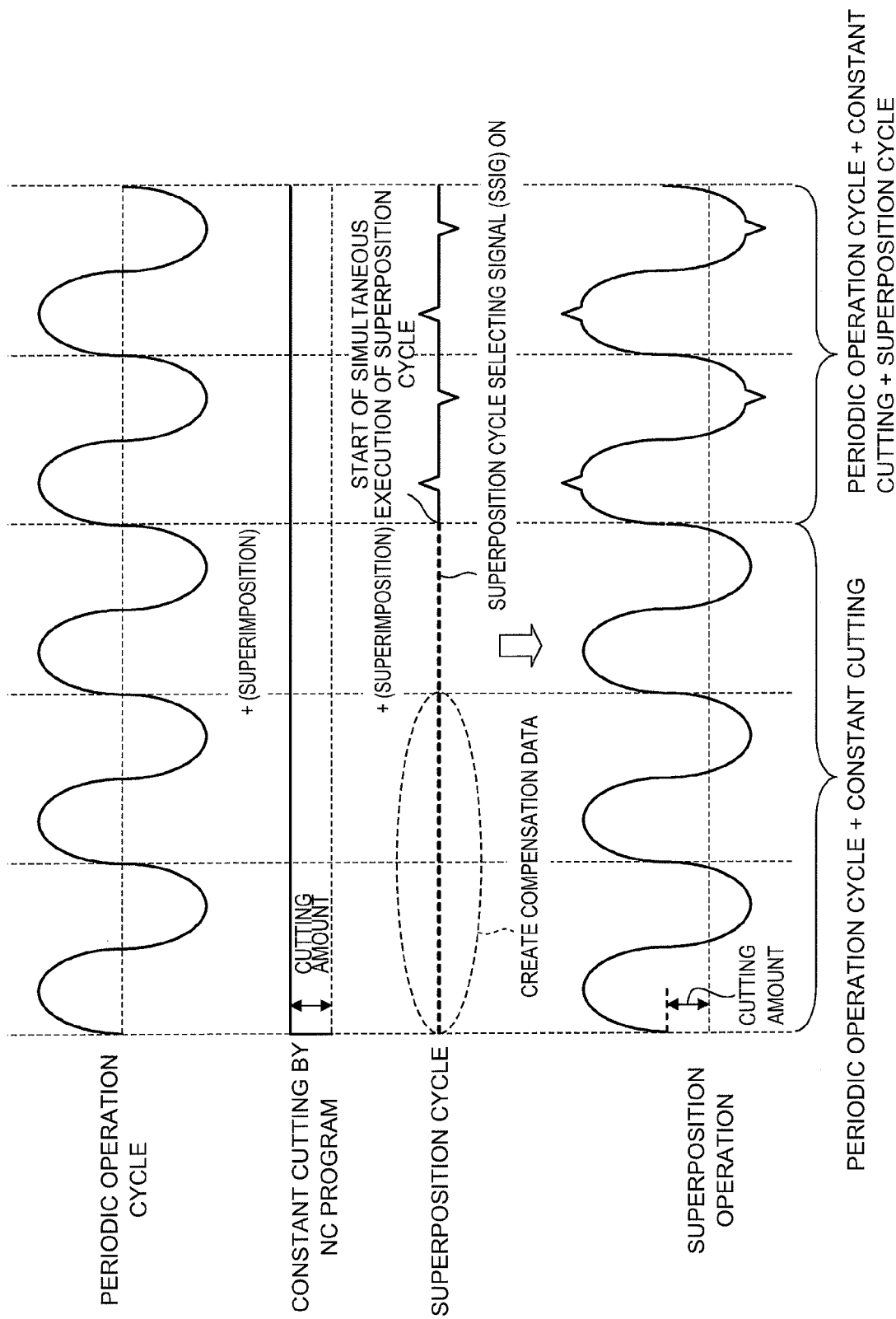

FIG.6

20001=10　(REPEAT COUNT IS 10)

20002=200　(THE NUMBER OF DATA SETS IS 200)

20003=40000　(START NUMBER OF DISTRIBUTION DATA OF FIRST AXIS IS #40000)

20004=50000　(START NUMBER OF DISTRIBUTION DATA OF SECOND AXIS IS #50000)

⎫
⎬ HEADER OF CYCLE 1
⎭

..

40000=10　(FIRST DISTRIBUTION DATA OF FIRST AXIS)

..

40199=5　(200-TH DISTRIBUTION DATA OF FIRST AXIS)

⎫
⎬ DISTRIBUTION DATA OF FIRST AXIS OF CYCLE 1
⎭

..

50000=20　(FIRST DISTRIBUTION DATA OF SECOND AXIS)

..

50199=10　(200-TH DISTRIBUTION DATA OF SECOND AXIS)

⎫
⎬ DISTRIBUTION DATA OF SECOND AXIS OF CYCLE 1
⎭

..

NUMERICAL CONTROLLER HAVING FUNCTION OF SUPERIMPOSING SUPERPOSITION CYCLE SYNCHRONIZED WITH PERIODIC OPERATION CYCLE

RELATED APPLICATION DATA

This application claims priority under 35 U.S.C. § 119 and/or § 365 to Japanese Application No. 2014-122249 filed Jun. 13, 2014, the entire contents is incorporated herein by reference.

BACKGROUND OF THE INVENTION

1. Field of the Invention

The present invention relates to a numerical controller, and more particularly, to a numerical controller having a function of machining a workpiece by a periodic cycle operation.

2. Description of the Related Art

In a numerical controller (CNC), in case where an interior of a vertically placed cylinder is ground for example, more specifically, in case where machining for moving the grind stone along a shape of an inner wall of the cylinder is carried out by moving a rotation axis and an axis in a cutting direction of a grind stone at high speed by high-speed cycle machining, a technique of high-speed cycle machining control is used.

To perform the high-speed cycle machining, a machining shape is converted into high-speed cycle machining data, it is stored in a variable region in the numerical controller, high-speed cycle machining data is called by an NC program command, distribution data which is command data every execution cycle from the nigh-speed cycle machining data, and the high-speed cycle machining is executed.

FIG. 6 shows an example of conventional high-speed cycle machining data.

As shown in FIG. 6, the high-speed cycle machining data includes headers and distribution data sets. Repeat count of cycle, the number of data sets and start number of distribution data are defined in the header, and the distribution data sets of the designated number by the header for each of axes are prepared.

FIG. 7 shows, by means of a graph of time and distribution data sets of a control axis of a machining machine, a relation between distribution data and cycle data of one cycle formed by gathering a plurality of distribution data sets.

As a conventional technique concerning such high-speed cycle machining, JP 2010-009094 A proposes a technique in which an NC program command and a moving amount of high-speed cycle machining which repeatedly executes the same operation and carries out a periodical operation are superimposed on each other. According to the technique disclosed in JP 2010-009094 A, a periodical operation carried out by the high-speed cycle machining and an arbitrary operation carried out by an NC program are superimposed on each other as shown in FIG. 8.

The technique described in JP 2010-009094 A is useful for superimposing a predetermined periodical operation and the NC program command on each other, but if it is desired to issue a command for compensating a machining error with respect to a specific position in one period of the periodical operation, it is difficult to every time issue a command in synchronization with specific timing of the periodical operation by the NC program. Hence, the machining error is compensated in accordance with the following procedure.

(1) First machining is carried out with high-speed cycle machining data in which compensation data is not included.
(2) Compensation data is measured.
(3) High-speed cycle machining data including the compensation data of (2) is created.
(4) Second machining is carried out with the high-speed cycle machining data of (3).

FIG. 9 shows periodical operations and compensation data. When a machining error corresponding to one period of a periodical operation is to be compensated, the conventional technique has a problem that it takes effort to create high-speed cycle machining data including compensation data, and machining must be carried out twice.

As another conventional technique related to the high-speed cycle machining, WO 2004/102290 A, for example, proposes a technique for superimposing moving data for carrying out chopping operation and moving data for carrying out a contouring control on each other, and a technique for compensating a servo delay of a control axis which carries out a chopping operation.

The technique described in WO 2004/102290 A is started by executing a chopping operation activating command, and a compensation amount for compensating a servo delay is internally calculated, and it is not possible to start superimposition at arbitrary timing or set an arbitrary compensation amount. Therefore, this technique cannot be applied in a case where a machining error corresponding to one period of a periodical operation is to be compensated.

SUMMARY OF THE INVENTION

Therefore, in view of the problem of the conventional techniques, it is an object of the present invention to provide a numerical controller for realizing a method of superimposing commands such as compensation data on each other in synchronization with specific timing in a periodic operation cycle.

The numerical controller according to the present invention controls a machine tool which carries out machining by moving a workpiece or a tool using a periodic operation cycle for repeatedly executing the same operation. The numerical controller includes: a superposition cycle storing unit for storing command data of each execution period of a superposition cycle superimposed with the periodic operation cycle; and a superposition cycle synthesizing unit synthesizing command data of the superposition cycle every execution period in synchronization with execution timing of the periodic operation cycle.

The numerical controller according to the present invention may include a superposition cycle selecting unit for starting superimposition of the superposition cycle in synchronization with execution timing of the periodic operation cycle.

The superposition cycle storing unit may store one or more superposition cycles, and the superposition cycle selecting unit can select, one or more superposition cycles to be superimposed.

The numerical controller may further include a changing unit for changing command data of the superposition cycle of the superposition cycle storing unit during execution of the periodic operation cycle.

According to the present invention, it is possible to provide a numerical controller for superimposing commands such as compensation data on each other in synchronization with specific timing in a periodic operation cycle.

BRIEF DESCRIPTION OF THE DRAWINGS

The above and other objects and features of the present invention will be apparent from the following description of embodiments with reference to the accompanying drawings, in which:

FIG. 2 is a diagram showing one example of high-speed cycle machining data for setting a periodic operation cycle and a superposition cycle;

FIG. 3 is a flowchart showing procedure of processing executed by a superposition cycle selecting unit and a superposition cycle synthesizing unit in the numerical controller shown in FIG. 1;

FIG. 4 is a time chart showing an example of a superimposing operation when the numerical controller shown in FIG. 1 executes a superposition cycle;

FIG. 6 is a diagram showing high-speed machining cycle data in a conventional technique;

DETAILED DESCRIPTION OF THE PREFERRED EMBODIMENTS

Figure 1:
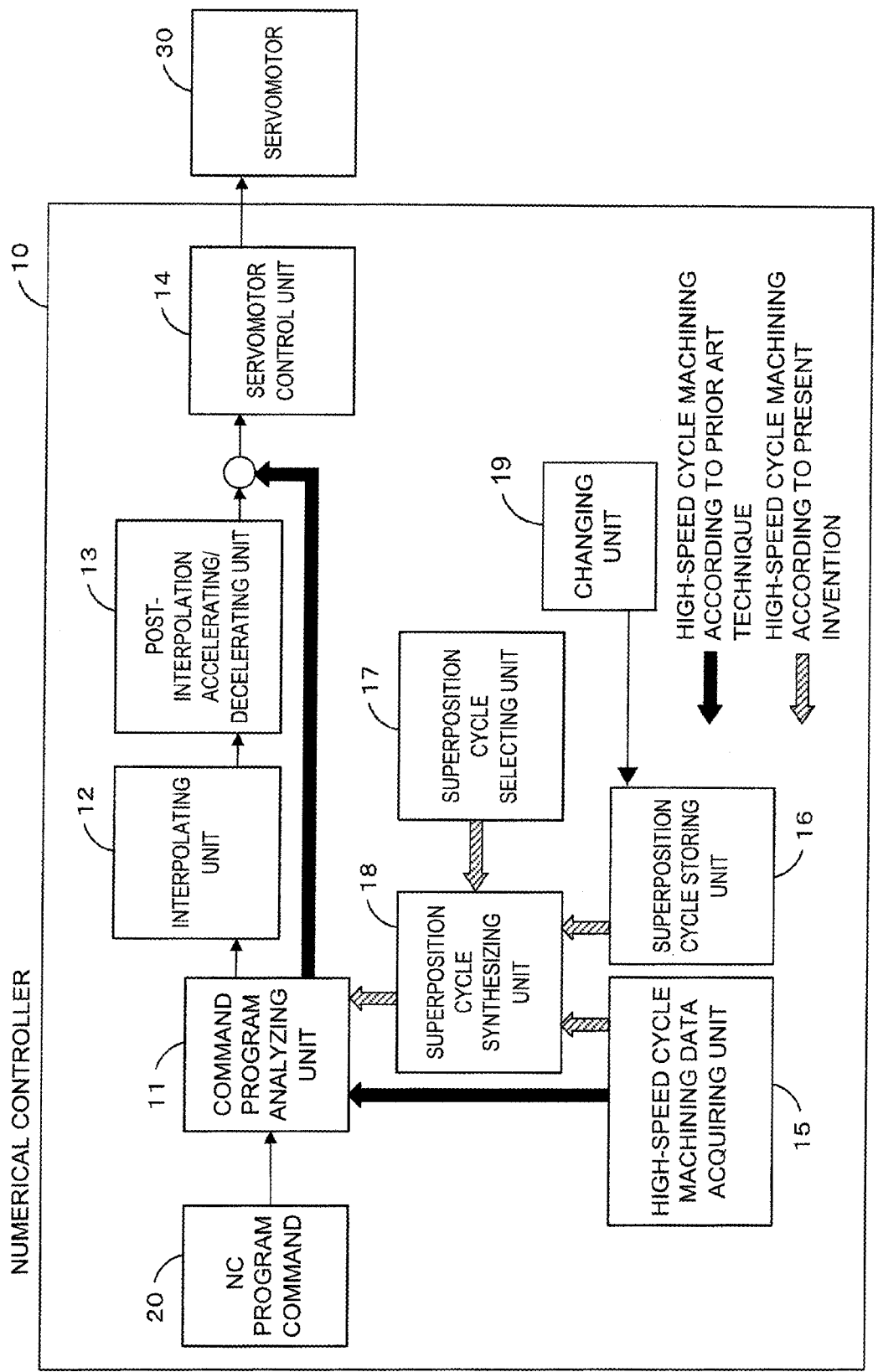
FIG. 1 is a block diagram showing essential portions of an embodiment of a numerical controller according to the present invention.

First, an embodiment of a numerical controller according to the present invention will be described using a block diagram shown in FIG. 1.

The numerical controller 10 includes a command program analyzing unit 11, an interpolating unit 12, a post-interpolation accelerating/decelerating unit 13, and a servomotor control unit 14. The command program analyzing unit 11 reads an NC program command 20 stored in a memory (not shown), analyzes the read NC program command 20 and acquires a moving command. The interpolating unit 12 carries out interpolating processing which determines a large number of interpolation points along a moving path based on the moving command analyzed by the command program analyzing unit 11. The post-interpolation accelerating/decelerating unit 13 executes accelerating/decelerating processing such that a moving command which designates a smooth velocity change with acceleration within a predetermined limit is output to the servomotor control unit 14 after the interpolating processing carried out by the interpolating unit 12 is completed. The servomotor control unit 14 drives a servomotor 30 based on output of the post-interpolation accelerating/decelerating unit 13 and relatively moves a tool with respect to workpiece.

The numerical controller 10 includes a high-speed cycle machining data acquiring unit 15 as a unit for carrying out the high-speed cycle machining. When the high-speed cycle machining is carried out, the high-speed cycle machining data acquiring unit 15 acquires high-speed cycle machining data from the memory (not shown), produces moving data from the acquired high-speed cycle machining data, and outputs the same to the command program analyzing unit 11. The command program analyzing unit 11 outputs the moving data acquired from the high-speed cycle machining data acquiring unit 15 to the servomotor control unit 14 not through the interpolating unit 12 and the post-interpolation accelerating/decelerating unit 13, and relatively moves a tool with respect to workpiece based on the moving data.

To realize a function of superimposing, on each other, superposition cycles synchronized with the periodic operation cycle, the numerical controller 10 includes a superposition cycle storing unit 16, a superposition cycle selecting unit 17 and a superposition cycle synthesizing unit 18. A changing unit 19 is provided to change command data of the superposition cycle of the superposition cycle storing unit 16 during execution of the periodic operation cycle.

Superposition data of the superposition cycle is stored in the superposition cycle storing unit 16. If the superposition cycle selecting unit 17 receives a signal for executing superposition control of the superposition cycle, the superposition cycle selecting unit 17 sends, to the superposition cycle synthesizing unit 18, a command for superimposing the superposition cycle on the periodic operation cycle. If the superposition cycle synthesizing unit 18 receives, from the superposition cycle selecting unit 17, the command for superimposing the superposition cycle on the periodic operation cycle, the superposition cycle synthesizing unit 18 creates moving data in which distribution data of periodic operation cycle acquired from the high-speed cycle machining data acquiring unit 15 and superposition data of the superposition cycle acquired from the superposition cycle storing unit 16 are synthesized, and the superposition cycle synthesizing unit 18 outputs the same to the command program analyzing unit 11. The command program analyzing unit 11 outputs the moving data synthesized by the superposition cycle synthesizing unit 18 to the servomotor control unit 14 not through the interpolating unit 12 and the post-interpolation accelerating/decelerating unit 13, and relatively moves a tool with respect to workpiece based on the moving data.

Next, one example of the high-speed cycle machining data which sets the periodic operation cycle and the superposition cycle is described with reference to FIG. 2.

The superposition data of the superposition cycle is set together with the distribution data of periodic operation cycle in a variable region of high-speed cycle machining data in which a high-speed cycle machining operation is set. The setting operation of the superposition data of the superposition cycle is carried out in the superposition cycle storing unit 16 shown in FIG. 1. The superposition data of the superposition cycle includes headers and superposition data.

The repeat count and the number of data sets for the superposition cycle are not especially defined in the headers of the superposition data because they comply with the headers of the periodic operation cycle (0 is defined as dummy), and only a start number of the superposition data is defined in the header of the superposition data. From a number designated by the start number of the superposition data, the superposition data sets of the designated number by the header of the periodic operation cycle for each of axes are prepared.

Procedure of processing executed by the superposition cycle selecting unit 17 and the superposition cycle synthesizing unit 18 of the numerical controller 10 shown in FIG. 1 will be described with reference to the flowchart shown in FIG. 3. This processing is executed when the command program analyzing unit 11 is invoked for each of interpolation periods. Variables used in this flowchart will be described below.

A superposition cycle in-execution flag F0 is a flag variable indicative of whether or not processing for superimposing the superposition cycle is executing with respect to the current periodic operation cycle. When the superposition cycle in-execution flag F0 is 1, this shows a state where processing for superimposing the superposition cycle and outputting the same is executed, and when the superposition cycle in-execution flag F0 is 0, this shows a state where the superposition cycle is not superimposed (initial value of the flag F0 is 0).

A superposition cycle selection signal SSIG is a signal used for instructing, from outside, as to whether the superposition cycle is to be superimposed or not. The superposition cycle selection signal SSIG is input from an operation panel (not shown), or is input when a signal which is input from a sensor or the like is processed by a ladder program or the like. When the superposition cycle selection signal SSIG is 1, the processing for superimposing the superposition cycle is executed.

An interpolation period counter Tp is a counter which changes every one period of the periodical operation, and is 1 when the periodical operation is started. The interpolation period counter Tp increases by 1 every one interpolation period, and its maximum value is a number of data sets Tpmax of interpolation period. For example, in a setting example of the periodic operation cycle shown in FIG. 2, Tp is 1 to 360.

Moving data MVp is moving data in the interpolation period counter Tp. Further, distribution data PCYCp of the periodic operation cycle is distribution data of periodic operation cycle in the interpolation period counter Tp (e.g., in a setting example of periodic operation cycle shown FIG. 2, when Tp=1, PCYCp=10). Superposition data SCYCp of the superposition cycle is superposition data of the superposition cycle in the interpolation period counter Tp (e.g., in a setting example of superposition cycle shown FIG. 2, when Tp=1, SCYCp=2).

When this processing (processing of superposition cycle selecting unit 17 and processing of superposition cycle synthesizing unit 18) is started, it is determined whether or not the superposition cycle in-execution flag F0 matches with the superposition cycle selection signal SSIG (step S01). If the superposition cycle in-execution flag F0 and the superposition cycle selection signal SSIG do not match with each other in step S01, determination of switching of an execution state of superimposing processing is made. If the interpolation period counter Tp is 1 when this processing is executed (step S02), i.e., the current interpolation period is a period where the periodical operation is started, a value of the superposition cycle selection signal SSIG is set to the superposition cycle in-execution flag F0 (step S03). By this processing, when each of the periodical operations is started, a starting state of the processing for superimposing the superposition cycle is switched. The processing of steps S01 to S03 corresponds to the operation of the superposition cycle selecting unit 17 in the numerical controller shown in FIG. 1.

Next, a value of the superposition cycle in-execution flag F0 is determined (step S04) When the value of the superposition cycle in-execution flag F0 is 1, a value obtained by adding the distribution data PCYCp of the periodic operation cycle Lo the superposition data SCYCp of the superposition cycle is assigned to the mooring data MVp (step S05). When the value of the superposition cycle in-execution flag F0 is 0, on the other hand, the value of the distribution data PCYCp of the periodic operation cycle is assigned to the moving data MVp as it is (step S06). The processing in steps S04 to S06 corresponds to the operation of the superposition cycle synthesizing unit 18 in the numerical controller shown in FIG. 1.

Lastly, the interpolation period counter Tp is renewed (incremented by 1) (step S07). If the renewed interpolation period counter Tp exceeds the maximum value Tpmax of the interpolation period counter (step S08), the value of the interpolation period counter Tp is reset to 1 (step S09), and this processing in this interpolation period is completed.

The superposition operation carried out by the numerical controller 10, as described above, will be described in detail based on an actual example.

FIG. 4 is a time chart showing an example of the superimposing operation when the superposition cycle is executed.

When the periodic operation cycle shown in FIG. 2 is set in the numerical controller 10, the distribution data (PCYC1 to PCYC360) of the periodic operation cycle is repeatedly executed in the periodical operation. In one interpolation period (e.g., 1 msec), one distribution data is executed, and the moving data MVn which is output in a counter n of the interpolation period becomes PCYCn (see the upper part of a graph in FIG. 4).

In the middle of execution of such a periodical operation, an operator measures a machining error during the periodical operation, and data for compensating the measured machining error can be set to superposition data (SCYC1 to SCYC360) of the superposition cycle. The operator sets the superposition data of the superposition cycle in the superposition cycle storing unit 16 through an inputting unit such as an operation panel of the numerical controller 10 or an inputting unit from an external device, and if a superposition cycle selection signal (SSIG) for choosing whether the superposition cycle will be executed or not is turned ON by operating the operation panel, for example, the superposition cycle can be started from when first distribution data (PCYC1) of the periodic operation cycle is executed next time.

If processing for superimposing the superposition cycle is executed, the moving data MVn and the superposition data (SCYC1 to SCYC360) of the superosition cycle are synthesized by the superposition cycle synthesizing unit 18. When the superposition cycle is executed, the moving data MVn in the counter n of the interpolation period is sum of PCYCn and SCYCn (that is, MVn=PCYCn+SCYCn).

In each of the periodic operation cycle and the superposition cycle, the interpolation period which is an execution interval is constant. Therefore, the superposition cycle can be superimposed in synchronization with timing of execution of the periodic operation cycle. According to this it is possible to perform machining in which a machining error is compensated through one machining without re-creating the periodic operation cycle.

Timing for starting the superposition cycle may be counter n of any interpolation period. The superposition data (SCYC1 to SCYC360) can be changed during execution of the superposition cycle.

Figure 5:
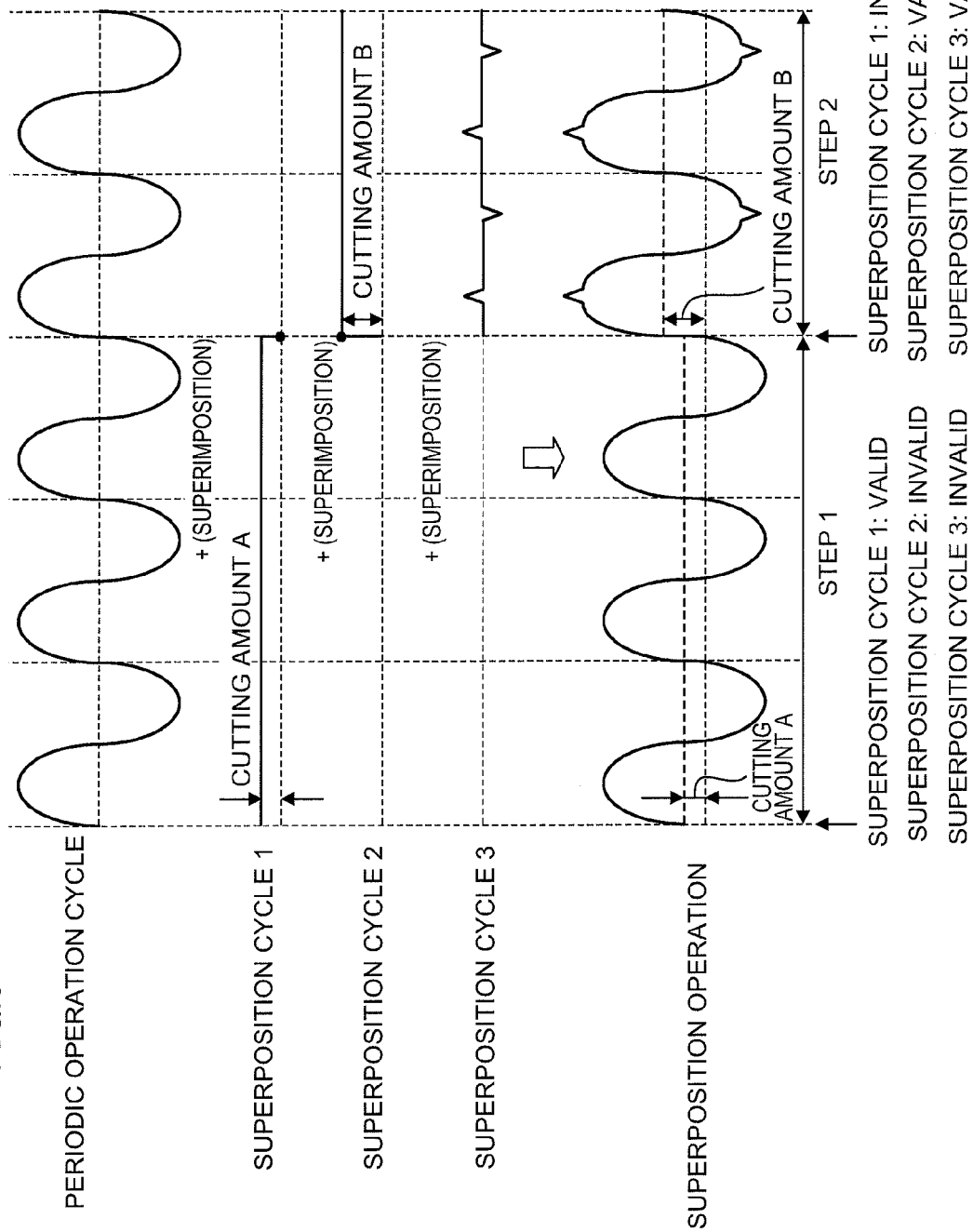
FIG. 5 is a time chart showing an example of the superimposing operation when the numerical controller shown in FIG. 1 executes a plurality of superposition cycles.
Figure 7:
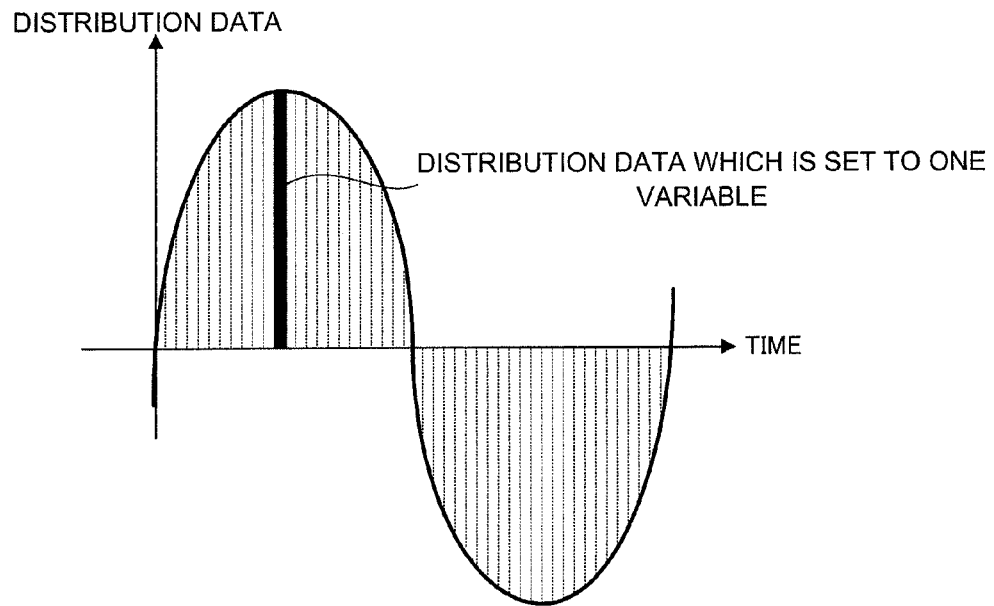
FIG. 7 is a diagram showing a relation between distribution data and one periodical operation in the conventional technique.
Figure 8:
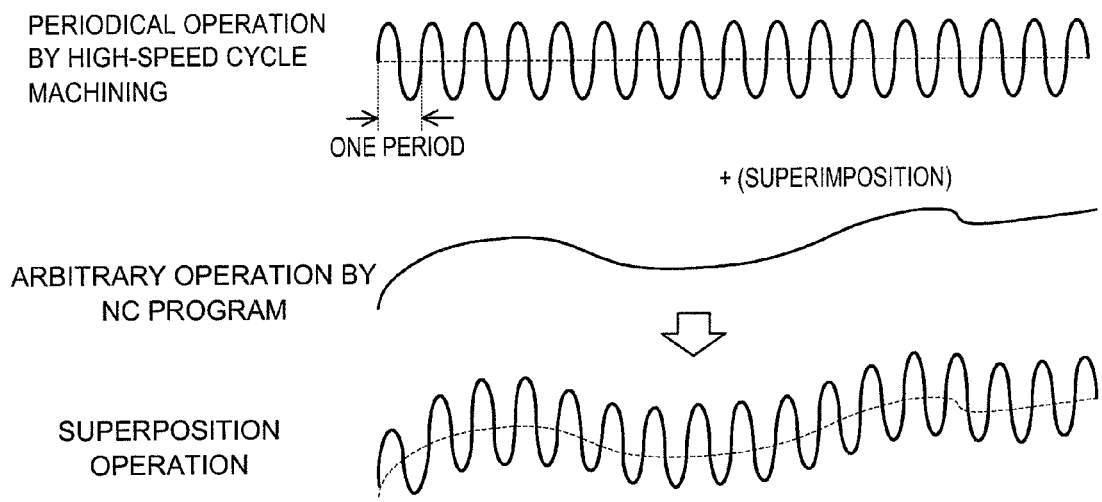
FIG. 8 is a diagram showing a superimposing operation in the conventional technique.
Figure 9:
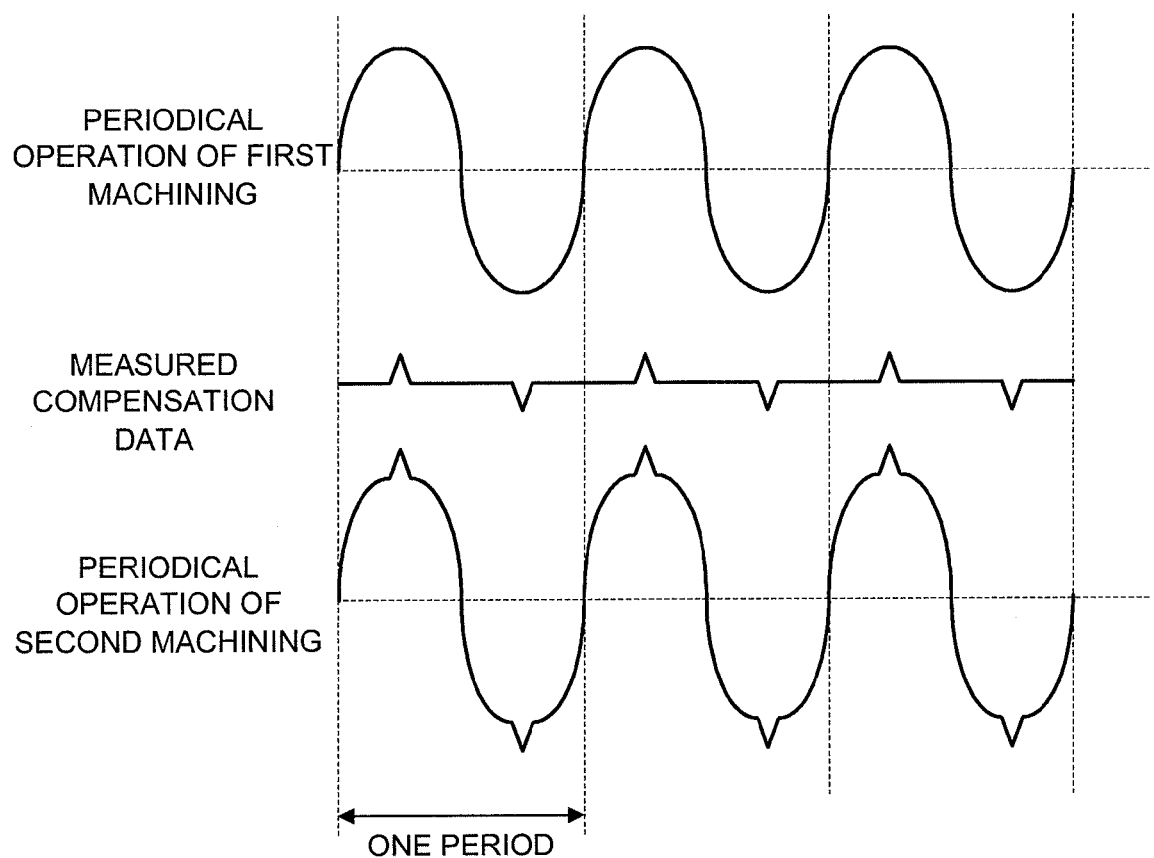
FIG. 9 is a diagram showing a periodical operation and compensation data in the conventional technique.

FIG. 5 is a time chart showing an example of the superimposing operation when a plurality of superposition cycles are executed at arbitrary timing.

The numerical controller 10 according to this embodiment can also execute a plurality of superposition cycles at arbitrary timing. The following superposition cycles 1 to 3 are created, the superposition cycle 1 can be executed in step 1, and the superposition cycles 2 and 3 can be executed in step 2.

Superposition cycle 1: cutting amount A in step 1

Superposition cycle 2: cutting amount B in step 2

Superposition cycle 3: compensation amount of machining error

When the numerical controller is configured such that it is possible to select and switch a plurality of superposition cycles as described above, a superposition cycle in-execution flag F0n and a superposition cycle selection signal SSIGn may be provided for each of respective superposition cycles, and the superposition cycle selecting unit 17 may select the superimposing processing for each of the superposition cycles.

The invention claimed is:

1. A numerical controller for controlling a machine tool which carries out machining by moving a workpiece or a tool using a periodic operation cycle for repeatedly executing the same operation, the numerical controller comprising:

a superposition cycle storing unit configured to store command data of each execution period of a superposition cycle superimposed with the periodic operation cycle;

a superposition cycle selecting unit configured to start superimposition of the superposition cycle in synchronization with execution timing of the periodic operation cycle if the superposition cycle is made effective, and to end superimposition of the superposition cycle in synchronization with execution timing of the periodic operation cycle if the superposition cycle is made ineffective; and a superposition cycle synthesizing unit configured to synthesize command data of the superposition cycle every execution period in synchronization with execution timing of the periodic operation cycle.

2. The numerical controller according to claim 1, wherein the superposition cycle storing unit stores one or more superposition cycles, and the superposition cycle selecting unit can select one or more superposition cycles to be superimposed.

3. The numerical controller according claim 1, further comprising a changing unit configured to change command data of the superposition cycle of the superposition cycle storing unit during execution of the periodic operation cycle.

4. The numerical controller according to claim 2, further comprising a changing unit configured to change command data of the superposition cycle of the superposition cycle storing unit during execution of the periodic operation cycle.

* * * * *